United States Patent [19]

Duke, Jr. et al.

[11] Patent Number: 5,605,744
[45] Date of Patent: Feb. 25, 1997

[54] LAMINATED PAPER GLASS CAMOUFLAGE

[75] Inventors: Jonathan C. Duke, Jr., Tyndall AFB, Fla.; Bartley P. Durst, Vicksburg, Miss.; David L. Meeker, Bryon, Tex.

[73] Assignee: The United States of America as represented by the Secretary of the Army, Washington, D.C.

[21] Appl. No.: 493,037

[22] Filed: Jun. 21, 1995

Related U.S. Application Data

[62] Division of Ser. No. 184,704, Jan. 21, 1994, Pat. No. 5,474,837.

[51] Int. Cl.⁶ .............................. B32B 17/12; B32B 17/06
[52] U.S. Cl. ......................... 442/259; 442/391; 442/412
[58] Field of Search .................................. 428/247, 256, 428/246, 248, 251, 264, 260, 268

[56] References Cited

U.S. PATENT DOCUMENTS 4,563,321   1/1986   Gessford ................................ 264/255

Primary Examiner—Kathleen Choi
Attorney, Agent, or Firm—Luther A. Marsh; Katherine E. White

[57] ABSTRACT

Rigid composite laminates of paper and glass layers, suitable for use as camouflage, are provided. This combination of components allows for great versatility in the final design and utility. A strong bond is obtained between paper and a fiberglass layer due to formation of a resin-cellulose matrix which allows interbonding between the paper and fibrous glass. The composite laminates may include other coatings or signature control layers and can be used as simple appliques or construction materials. A method for preparing the composite laminates is also provided wherein the paper is treated to enhance porosity in the formation of the resin-cellulose matrix.

5 Claims, 1 Drawing Sheet

LAMINATED PAPER GLASS CAMOUFLAGE

This is a division of application Ser. No. 08/184,704 filed on Jan. 21, 1994, now U.S. Pat. No. 5,474,837.

FIELD OF THE INVENTION

The present invention is directed to rigid composite laminates, more particularly laminated paper-glass (LPG) appliques for camouflage and methods for producing the same.

BACKGROUND OF THE INVENTION

As weapon systems become increasingly lethal because of increased accuracy, to be detected and identified is to be engageable and thus vulnerable to attack. This exists for mobile, semi-mobile and fixed targets. Camouflage, concealment ant deception (CCD) is a fundamental military science that offers a means to delay, deny, decoy or otherwise disrupt the target acquisition and engagement processes. Other than optimizing the use of environmental features and controlling operational signatures, the utility of a camoufleur is a materials limited science. Currently, CCD materials can be divided into two categories: low cost/ simple materials (examples: paints and nets), and expensive/ exotic materials (example: coatings, radar-absorbent materials and composites). With recognizance, surveillance, and target acquisitions becoming increasingly more sophisticated in both sensor(s), performance and processing capabilities, it is necessary to increase a camoufleur's ability to control and manipulate target signatures beyond that currently available with the lower technology materials at a cost significantly less than that associated with the high technology solutions. A hybrid technology is acquired, one that combines the best features of both technology classes, i.e., high performance at reduced cost.

OBJECTS OF THE INVENTION

It is an object of the present invention to provide materials for use in camouflage, concealment and deception with improved performance at reduced costs.

It is another object of the present invention to provide appliques suitable for use as camouflage, wherein the physical and spectral characteristics can be controlled with great latitude by adding special layers or coatings.

It is another object of the present invention to provide camouflage comprised of materials that provide significant flexibility in manipulating the fundamental characteristics of the camouflage to maximize its utility.

It is another object of the present invention to provide camouflage which is easy to assemble and use.

It is a further object of the present invention to provide construction materials for shelters and decoys with camouflaging features incorporated therein.

An additional object of the present invention is to provide a method for forming rigid laminated paper-glass (LPG) composites which provides a bond between the fibrous glass and the paper core.

Upon further study of the specification and appended claims, further objects and advantages of this invention will become apparent to those skilled in the art.

Without further elaboration, it is believed that one skilled in the art can, using the preceding description, utilize the present invention to its fullest extent.

The entire disclosure of all applications, patent and publication,s cited above and below, are hereby incorporated by reference.

SUMMARY OF THE INVENTION

The present invention provides composite laminates which are rigid having a core layer comprised of an opaque porous and fibrous pulp paper and two encapsulating layers comprised of fibrous glass. In a preferred embodiment, the rigid composite laminate is in the form of an applique used as camouflage and is referred to herein as laminated paper-glass (LPG) appliques. The paper and fibrous glass are impregnated with a bonding resin. The resin impregnated within the paper forms a resin-cellulose matrix. The resin within the matrix and the resin impregnated within fibrous glass provide a bonding surface for the pulp paper and the fibrous glass and bond the layers together.

In preferred embodiments, the cellulose fibers within the paper are treated with styrene or a similar agent to break them down and are optionally softened with ammonia to facilitate forming the resin-cellulose matrix.

LPG appliques of this invention optionally contain additional layers of material and/or external coatings to alter their properties (physical and spectral).

A process for producing LPG appliques is also provided wherein kraft paper or similar pulp paper is treated to break down the cellulose fibers therein, a bonding resin is impregnated in the paper and cured. Each side of the paper is then coated with a fibrous cloth impregnated with resin. A vacuum is applied to remove any voids between the paper and fibrous cloth and the composite is allowed to cure.

DETAILED DESCRIPTION OF THE PREFERRED EMBODIMENT

An opaque, porous and fibrous pulp paper, preferably kraft paper, such as 90 lb. weight grade, is used as the core layer in construction of the rigid composite laminates of this invention, particularly the LPG appliques. Kraft paper is preferred for its optical opacity, compressive strength and absence of wax and inert fillers typical of other papers. Its porous and fibrous nature contributes to the overall composite formation by providing a low cost, easy to handle medium for treatment agents and bonding resins such as polyester, to permeate and create a bonding layer.

Figure 1:
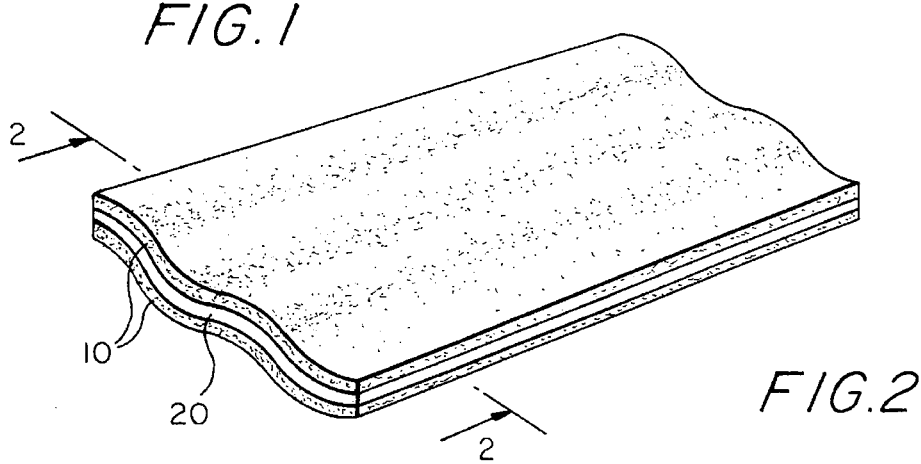
FIG. 1 shows a cutaway view of a basic laminated paper glass applique of the present invention in the form of corrugated sheathing.
Figure 2:
FIG. 2 shows a side view of the corrugative sheathing shown in FIG. 1.

Referring to the basic laminated paper glass applique of FIGS. 1 and 2, the core layer 20 is shown encapsulated with two layers of resin impregnated fibrous glass 10, typically fiberglass cloth. These encapsulating layers add significantly to the overall shear strength and tensile strength of the composite laminate. When combined with the cellulose-resin matrix of the core layer, the resulting composite laminate displays enhanced rigidity and durability. Fiberglass cloths which are preferred are those having proven resin porosity.

The bonding resins, preferably polyester resins, soak into the fibers of the paper to form a resin-cellulose matrix and upon cure, the resin provides a bonding surface for bonding the paper to the fibrous glass. Conventional catalysts and bonding resins typically used as matrices for fiberglass cloth can be used in the present invention. Polyester resins are advantageous for their low cost, fast curing properties and high bonding strength. Resins comprised of vinyl toluene and acrylate monomers have been shown to form a suitable resin-cellulose matrix and a tough, waterproof exterior layer for the composite laminate when cured and are translucent over a wide spectral band. Translucency is significant in maintaining any pattern printed on the kraft paper of the core layer.

In forming the matrix of cellulose (paper) and resin, some of the cellulose is broken down with a treating agent to create a fuzzy layer of fiber on the paper surface. This aids the resin in permeating and bonding with the paper. Styrene is a suitable treating agent and can be added with the bonding resin used to impregnate the paper.

In a preferred embodiment, the shaping of the composite laminate or applique and the formation of the resin-cellulose matrix is aided by pretreatments with ammonia. Ammonia acts as an agent to soften the cellulose throughout the paper and also eliminate the oil residues and excess moisture while making the paper more malleable and formable for molding.

Although the composite laminates herein are particularly useful as appliques for camouflage, additional fiber reinforcement can be included in the composite to enhance rigidity and strength for use as construction materials, such as 4×8 sheathing or contoured components of a formed-piece kit. These construction materials can be used to provide temporary shelters and decoys.

The composite laminates of this invention are very adept to incorporating additional signal control layers and materials to aid in concealment and camouflage. Additional material layers may be sandwiched in the composite or adhered thereto. For example, lightweight sheets of material used for electromagnetic interference (EMI) can be incorporated to help alter radar signatures. Such materials can be adhered to or incorporated within the laminate of this invention. Other possible material layers consist of lightweight thermal insulators, such as foams of varying thickness to yield a mottled thermal image. Air bubbles encapsulated between two paper layers can alter the surface texture and also yield a mottled thermal image. Fine wire mesh can also be introduced to increase strength and radar scatter. The composite laminates may additionally comprise a plurality of metal fibers capable of imparting partial radar reflective characteristics.

Figure 3:
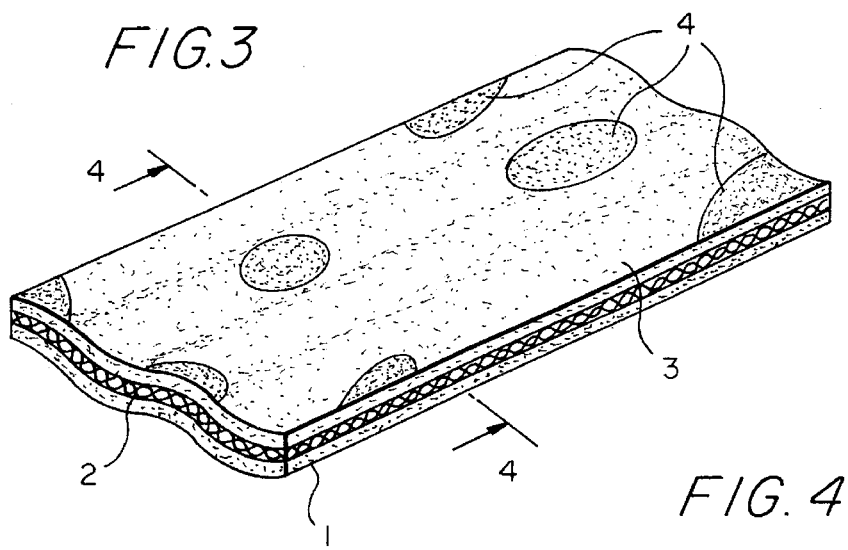
FIG. 3 shows a cutaway view of camouflage provided by the present invention comprising laminated paper glass appliques with additional signal modifying layers.
Figure 4:
FIG. 4 shows a side view of the camouflage of FIG. 3.

Further multispectral signature control may be introduced to the rigid composite laminate applique through external coatings in the form of standard camouflage paints and reduced emissivity coatings. Different paints can be applied on either side of the applique to increase its utility in environments which experience drastic seasonal variations in background signatures. For example, a northern climate may require a combination of paints, one with visual properties simulating green vegetation, the other with a snow background. Referring to the camouflage of FIGS. 3 and 4, a radar scattering layer 2, comprised of wire mesh is shown sandwiched between two LPG appliques 1 and 3. Emissivity coating 4 is applied to the exterior of LPG applique 3.

The rigid composite laminates of this invention can be employed in hard-to-hide facilities such as power plants with smoke stacks used in conjunction with emissivity coatings. Supply depots and other theater assets may also employ the rigid composites of the present invention.

The processes for preparing the composite laminate of the present invention allow for production of virtually any shape. These processes are not complex and do not vary in difficulty from conventional laminating processes. The process/procedure for material fabrication is very suitable for providing products with limited applications or for a special purpose, without specialized equipment or tools. The materials and process used depend upon the quality and assigned property, for example, strength and spectral properties of the finish product. For example, an applique that would augment or substitute for netting, one layer of treated paper and two layers of glass are adequate and compare quite favorably with netting in quality and cost. Construction materials typically require a mean thickness of about ¼ inch which simply requires the addition of more layers of paper and layers of glass. The construction materials find use in the manufacture of house trailers such as those employed in Saudi Arabia and other theaters of operation. These materials provide many advantages over conventional construction materials such as reduced signatures, energy efficiency, reduced transport volume and weight, rapid manual assembly and locatability. Fixed facility decoys can also employ the rigid composite laminate of this invention. The light weight of the finished product provides for collapsible systems in modular sections.

To prepare the rigid composite laminates of the present invention, the cellulose fibers of the paper are first prepared for impregnation with resin. The paper is typically cut to the desired dimensions of the finished product and is laid out on a mold surface, preferably comprised of aluminum; to conform to the mold contours. The paper is preferably soaked in ammonia so as to soften.

To provide an effective cellulose-resin matrix, it is necessary to break up these cellulose fibers with a treatment agent, such as styrene. The styrene breaks up the cellulose fibers and also thins the resin so as to allow it to permeate the paper completely. The styrene and bonding resin can be applied with a paintbrush as a mixture. Following saturation with the bonding resin, it is allowed to cure for about two hours.

Following cure of the impregnated resin, a sealer coat consisting of resin and catalyst may be applied to both sides of the paper and cured about 3 hours) to render it impervious to moisture. Following cure of the resin forming the resin-cellulose matrix, fiberglass cloth impregnated with resin is applied to each side of the paper. This can be accomplished by applying another coat of the resin to the side of the paper and overlaying the coating of resin with a fiberglass cloth. The resin is then forced into the fiberglass from below by pressure applied through the use of a paintbrush.

Figure 5:
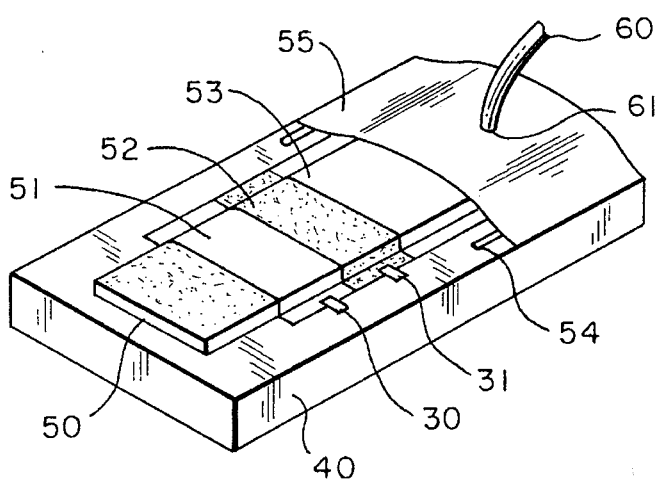
FIG. 5 shows a cutaway view of the vacuum process used in the process of this invention which forms LPG applique.

A vacuum is applied to remove fluid spaces from between the paper/cloth layers and expunge excess moisture. This process typically requires a series of steps, an example of which is described as follows and illustrated in FIG. 5. Following construction of the composite 50, it is positioned on a base 40. A layer of peal ply 51, high temperature fabric is overlaid on the paper/cloth and resin and held with tape 30. The fabric gives the composite a smooth texture finish. A perforated visqueen sheet 52 is then applied and held with tape 31 to provide a tear away layer between the peel ply and breather fabric. A breather fabric 53, resembling a thin foam sheet is placed over the visqueen to absorb excess resin and permit even distribution of the vacuum on the surface of the composite. Double sided adhesive tape 54 is then placed around the perimeter of the composite piece. A section of plastic 55 covers the entire test piece and adheres to the adhesive tape forming an airtight seal. The vacuum hose 60 is inserted into the plastic sheet and the orifice 61 is sealed. The vacuum pump is engaged drawing 10 psi on the test piece for 16 hours, leaving a composite with a smooth finish surface.

The composite is turned over and the steps for applying the impregnated fiberglass cloth are repeated as are the steps for application of a vacuum. The final product is hung for additional curing.

Conventional mixing tools and applicators such as paintbrushes, depressors and other equipment can be used in the process. A scale is used to measure the proper proportions of resin mix to ensure consistency of the material. A syringe is used to measure the desired catalyst needed for hardening the resin. Funnels are used for pouring chemicals into mixing vessels. Paper cups, unwaxed in various sizes are used as mixing vessels. A diaphragm-type vacuum pump with a maximum vacuum of 225 mmHg is used to ensure uniform lamination of composite materials and elimination of spaces. Nylon tubing (¼ inch diameter) with a functional temperature range of −60° to 160° F. is used as an interface between the vacuum pump and the composite mold. A perforated sheet of plastic, called a perf sheet, serves as a tear away layer between encapsulation materials and the composite materials. Breather material is required to permit a uniform vacuum to be drawn over the composite material and absorb any excess resin. Peal-ply, a porous synthetic cloth provides an even vacuum distribution and a smooth finished surface on the composite. Tacky tape is used to affix the encapsulated plastic sheet to the aluminum-base mold thus forming an airtight seal. An aluminum plate is used as a table and fabrication work surface.

The preceding process can be repeated with similar success by substituting the generically or specifically described materials and/or operating conditions generic or specific for equivalents of substitutes known in this are.

From the foregoing description, one skilled in the art can easily ascertain the essential characteristics of this invention, and without departing from the spirit and cope thereof, can make various changes and modifications of the invention to adapt is to various usages and conditions.

What is claimed is:

1. A camouflage composite laminate having a core layer comprised of kraft paper saturated with a mixture of styrene and polyester bonding resin to provide a resin-cellulose matrix, and two encapsulating layers of fiberglass cloth impregnated with polyester bonding resin, wherein the polyester resin within the resin-cellulose matrix and the resin impregnated within the fiberglass cloth provide a bonding surface that bonds the layers of kraft paper and fiberglass cloth together, said camouflage composite laminate further comprising a plurality of metal fibers capable of imparting partial radar reflective characteristics.

2. A camouflage composite laminate having a core layer comprised of kraft paper saturated with a mixture of styrene and polyester bonding resin to provide a resin-cellulose matrix, and two encapsulating layers of fiberglass cloth impregnated with polyester bonding resin, wherein the polyester resin within the resin-cellulose matrix and the resin impregnated within the fiberglass cloth provide a bonding surface that bonds the layers of kraft paper and fiberglass cloth together, wherein the composite laminate additionally comprises a fine wire mesh capable of imparting partial radar reflective characteristics and enhanced rigidity.

3. The camouflage composite laminate of claim 1, wherein the composite laminate additionally comprises sheets of electromagnetic interference material.

4. The camouflage composite laminate of claim 1, wherein the composite laminate further comprises a signature control layer sandwiched within the laminate.

5. The camouflage composite laminate of claim 1, wherein the composite laminate further comprises a signal control layer adhered to the laminate.

* * * * *